June 14, 1960  D. J. CHRISTENSON ET AL  2,940,283
SLIP CLUTCH
Filed Aug. 29, 1955
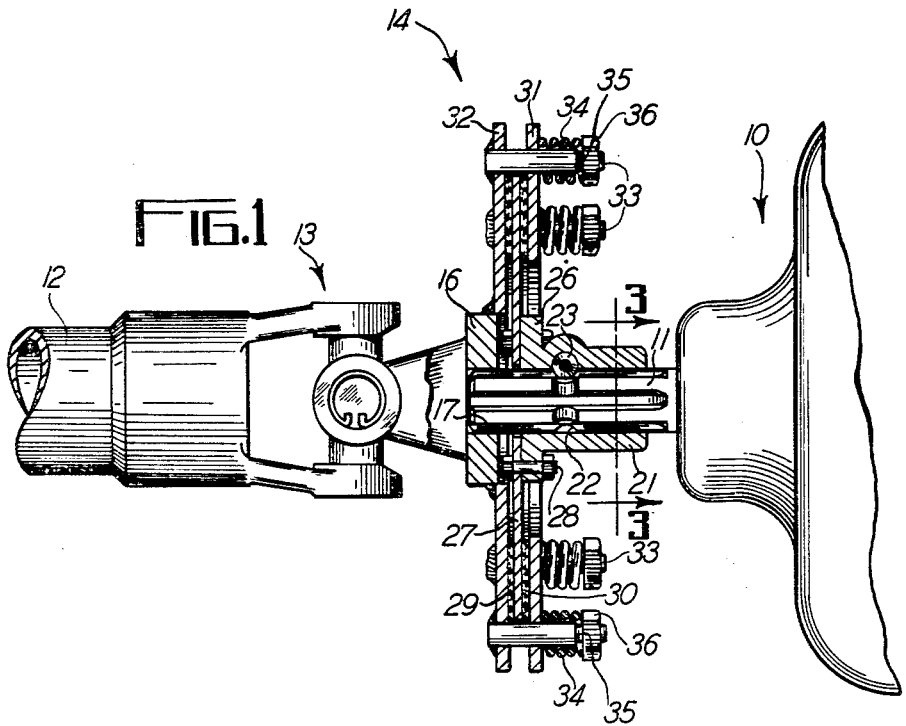
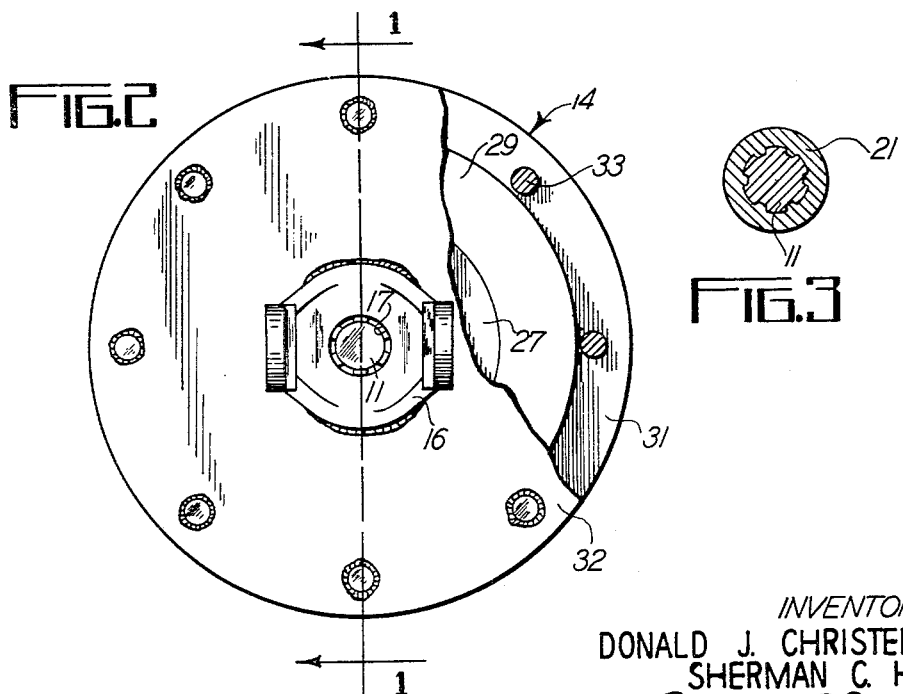
INVENTORS:
DONALD J. CHRISTENSON
SHERMAN C. HETH
BY: Emerson B. Donnell
ATTORNEY United States Patent Office 2,940,283
Patented June 14, 1960

2,940,283
SLIP CLUTCH

Donald J. Christenson, Kansasville, and Sherman C. Heth, Racine, Wis., assignors to J. I. Case Company, Racine, Wis., a corporation of Wisconsin Filed Aug. 29, 1955, Ser. No. 531,075

2 Claims. (Cl. 64—30)

This invention relates to clutches and, more specifically, it relates to slip clutches of the friction type.

It is an object of this invention to provide a clutch which transmits only a selected predetermined amount of torque and has means for easily and readily adjusting the clutch to select the amount of torque desired.

Another object of this invention is to provide a slip clutch which is simple in construction and is easy to assemble and disassemble.

Still another object is to provide a slip clutch where both sides of the clutch are positively maintained aligned. In the disclosed embodiment, this object is achieved by mounting both sides of the clutch on the clutch driving shaft for the alignment.

Other objects and advantages will become apparent upon reading the following description in conjunction with the accompanying drawings, wherein:

Fig. 1 is a sectional view of a preferred embodiment of this invention shown with driving and driven elements in full side elevation; the section being taken substantially on the line 1—1 of Fig. 2.

Fig. 2 is an end view of the embodiment shown in Fig. 1 but with parts removed and parts broken away.

Fig. 3 is a sectional view taken on the line 3—3 of Fig. 1.

The same reference numerals refer to the same parts throughout the several views.

Since this invention is particularly useful in heavy machinery power transmission, such as employed in tractors and farm implements, the following description is directed accordingly. Thus, a power take-off unit 10 of a tractor is shown fragmentarily in Fig. 1 with the usual splined drive shaft 11 projecting rearwardly from the unit 10. Aligned with the shaft 11 is a driven shaft 12 which is usually employed on a farm implement to connect with the power take-off shaft 11 of the tractor. In this instance, a universal joint 13 is disposed between the shaft 12 and the clutch 14 of this invention. Of course, the universal joint 13 allows for the relative angular movement between the implement and the tractor as the two move over uneven ground or the like. One section or element of the universal joint includes a flanged end 16 having an axially located circular opening 17 which receives the end of the shaft 11 but is not splined thereto so there is no drive connection between the shaft 11 and the joint 13 at the end of the shaft 11. Thus, the arrangement described positively aligns the drive shaft 11 and the universal joint 13 which is therefore piloted on the shaft 11 and is free to rotate on the shaft 11 and is a part of the driven shaft.

The clutch 14 includes a hub portion 21 which is splined onto the shaft 11, as shown in Fig. 3, and is, therefore, in driving relation with the shaft 11. The shaft 11 contains a circumferential groove 22 formed in the splines of the shaft to receive a plunger 23 removably disposed within an opening in the hub 21. The plunger is thus engaged with both the hub 21 and the shaft 11 to axially secure the two together. Details of this arrangement are clearly shown and described in U.S. Patent No. 2,696,089, particularly in Fig. 3 and lines 40 to 53 of column 3 of said patent.

The hub 21 also includes a flange 26 for attaching the hub to a friction plate 27 by a plurality of bolts 28. The usual plate facings or linings 29 and 30 are provided on the plate 27 at the outer section thereof, as shown, to annularly cover the opposite sides of the plate 27. One side of the plate 27 is flanked by an annular pressure plate 31 and the opposite side is flanked by a clutch plate 32. The latter is connected to the flanged end 16 of the universal joint as for example by welding. A plurality of studs 33 are shown welded to the plate 32 to project therefrom beyond the circumference of the plate 27 and through aligned holes in the pressure plate 31. The projected end of each stud 33 supports a compression coil spring 34 with a nut 36 retaining each spring 34 on each stud. Each nut is threadedly adjustable on its stud, the force of each spring acting between the plate 31 and its particular stud tending to urge plate 31 in one direction and the stud in the other direction, thereby yieldingly pressing plates 31 and 32 against the adjacent facings of the plate 27. The plates 27 and 32 will flex slightly if necessary to evenly distribute the pressure of the several springs 34 between the plates. It is preferred that each stud 33 be provided with a shoulder 35 to limit the amount which each nut can be threaded onto each stud to compress each spring. In this manner, the clutch acts as a safety device between the two shafts 11 and 12 as only torques up to a predetermined maximum amount can be transmitted between the plates of the clutch.

Thus, the power through the clutch is transmitted from the shaft 11, to the hub 21, then to the plate 27, and then to the plate 32 through frictional engagement with the facings on the plate 27, and a torque up to only a certain maximum amount will be transmitted through the clutch before the facing 29 will slip on the plate 32, thus limiting the torque which can be transmitted by the device and applied to either the shaft 11 or the shaft 12. Since the clutch is intended for use with a heavy agricultural machine, such as a forage harvester, the harvester being driven through the shaft 12 and inherently including an operating part such as the forage cutter wheel, which embodies a large amount of inertia, it is nevertheless practical to start the tractor promptly, clutch 14 slipping for a period while the cutter wheel is gradually brought up to speed. Upon abruptly stopping the flow of power to the drive shaft 11 as when stopping the tractor, the momentum of the harvester cutter wheel is operative on the clutch, shaft 12 then becoming the driving shaft and shaft 11 the driven shaft. As will be apparent the clutch arrangement will work equally well under these conditions. The very considerable momentum of the cutter wheel would therefore tend, in the situation described, to drive the tractor in a reverse flow of power and might readily make it impossible to stop the forward movement promptly by use of the tractor brakes, as might be necessary in an emergency. This is so because power take-off shaft 11 is commonly connected directly to the tractor gearing, down stream so to speak from the main tractor clutch. There is then no dependable way to disconnect shaft 11 from the traction wheels, particularly during the time that there is a flow of power through such gearing. However with the proper adjustment of the springs 34 the action of the tractor brakes will be sufficient to stop the rotation of shaft 11 through their action on the traction wheels or transmission, the momentum of the cutter wheel causing the clutch 14 to slip at the area of the facings on plate 27 and this is so even though springs 34 are adjusted to be tight enough to transmit, without slipping, the full power necessary to drive the cutter wheel under full normal load.

The operation of the device is thought to be clear from the above, sufficient to say a very simple slipping clutch construction has been provided in which the complication of the usual pilot shaft and bearing has been eliminated, the stub shaft 11 becoming the driving shaft (or driven shaft as the case may be) of or from plate 27, shaft 11 also serving by reason of the smooth bore in flange 16, as the pilot shaft for said flange and on which flange 16, plate 32 and plate 31 are journaled, guided and piloted to remain in correct alignment with plate 27 and shaft 11.

As will be apparent the device could be, and it is contemplated will be interposed in drives other than power take-off drives, shaft 11 for example being the input shaft of a gear box, and shaft 12 being the driving shaft supplying the power. Other variations will occur to those skilled in the art and it will be apparent that such changes could be made without departing from the scope of the invention which should therefore be limited only by the scope of the appended claims.

We claim:

1. A clutch comprising a splined shaft, a hub, splines on the interior of said hub for receiving said splined shaft with the latter axially fixed to said hub and having an extended end of said shaft with its splines projecting from said hub, a circular friction plate attached to said hub and disposed transversely to the axis thereof and said friction plate being flexible in the direction of said axis, a circular clutch plate of a size diametrically larger than said friction plate and disposed adjacent said friction plate on the side thereof opposite from said hub and journaled on said splines of said extended end of said shaft and rotatable with respect to said shaft, a circular pressure plate of a size diametrically larger than said friction plate and disposed adjacent said friction plate on the side thereof opposite said clutch plate, a plurality of studs attached to said clutch plate and projecting through said pressure plate beyond the circumference of said friction plate, a spring on each of said studs for urging said pressure plate toward said clutch plate, and a nut on each of said studs for adjusting the force of said springs against said pressure plate for the latter to bear against said friction plate and thereby flex said friction plate.

2. In a power transmission connection between two shafts, the combination comprising first and second rotatable shafts, the first shaft having a splined end, a splined clutch hub mounted on an intermediate section of said splined end of said first shaft and non-rotatable with respect thereto, a clutch friction plate attached to said hub and disposed transverse thereto, a driven clutch plate journaled on the splines on said spline end of said first shaft to be piloted thereon and rotatable with respect to said first shaft and disposed adjacent one side of said friction plate and attached to said second shaft to rotate therewith, a pressure plate disposed adjacent the other side of said friction plate, and yieldable means for adjustably pressing said pressure plate toward said driven clutch plate.

References Cited in the file of this patent
UNITED STATES PATENTS

| | | |
|---|---|---|
| 321,656 | Stolterfoht | July 7, 1885 |
| 786,306 | Neckerman | Feb. 18, 1904 |
| 1,887,355 | Kranick | Nov. 8, 1932 |
| 2,476,377 | Le Clair | July 19, 1949 |
| 2,618,136 | Wellaver | Nov. 18, 1952 |
| 2,723,572 | Bronzin | Nov. 15, 1955 |

FOREIGN PATENTS

| | | |
|---|---|---|
| 2,116 | Great Britain | Feb. 11, 1888 |
| 732,018 | Germany | Feb. 19, 1943 |